(12) United States Patent
Choi et al.

(10) Patent No.: US 8,955,056 B2
(45) Date of Patent: Feb. 10, 2015

(54) TERMINAL AND METHOD FOR ASSIGNING PERMISSION TO APPLICATION

(71) Applicant: Pantech Co., Ltd., Seoul (KR)

(72) Inventors: Suk Woon Choi, Seoul (KR); Jae Choon Park, Seoul (KR)

(73) Assignee: Pantech Co., Ltd., Seoul (KR)

( * ) Notice: Subject to any disclaimer, the term of this patent is extended or adjusted under 35 U.S.C. 154(b) by 72 days.

(21) Appl. No.: 13/652,886

(22) Filed: Oct. 16, 2012

(65) Prior Publication Data

US 2013/0227652 A1    Aug. 29, 2013

(30) Foreign Application Priority Data

Feb. 24, 2012   (KR) .................. 10-2012-0019064

(51) Int. Cl.
*G06F 21/62*    (2013.01)
*H04L 29/06*    (2006.01)

(52) U.S. Cl.
CPC ............ *G06F 21/6209* (2013.01); *G06F 21/62* (2013.01); *G06F 2221/2141* (2013.01); *H04L 29/06823* (2013.01); *H04L 63/10* (2013.01)
USPC ................. 726/4; 726/1; 726/2; 726/3; 726/5; 726/26; 726/27; 726/28; 726/29; 726/30; 713/164; 713/165; 713/166; 713/167; 709/225; 709/226; 709/227; 709/228; 709/229

(58) Field of Classification Search
CPC ..................... G06F 2221/2141; H04L 63/10
USPC ...................... 726/26–30, 1–5; 709/225–229; 713/164–167
See application file for complete search history.

(56) References Cited

U.S. PATENT DOCUMENTS 8,413,260 B2 * 4/2013 Chen et al. ................... 726/31
2002/0183056 A1 * 12/2002 Lundblade et al. .......... 455/425

(Continued)

FOREIGN PATENT DOCUMENTS

| EP | 1 526 429 | 4/2005 |
|---|---|---|
| KR | 10-2006-0005530 | 1/2006 |
| KR | 1020100054940 | 5/2010 |
| KR | 1020110084693 | 7/2011 |
| KR | 1020110100923 | 9/2011 |

OTHER PUBLICATIONS

The Extended European Search Report issued on Jul. 10, 2013 in European Patent Application No. 12 19 6428.2.

(Continued)

*Primary Examiner* — Josnel Jeudy
(74) *Attorney, Agent, or Firm* — H.C. Park & Associates, PLC (57) ABSTRACT

A terminal to assign permission to an application includes a storage device to store an application list including information of applications authorized to receive manager permission, and an application processor to receive a request for the manager permission from the application and to determine to allow the manager permission to the application in response to a determination that the application is included in the application list. A method that uses a processor to assign permission to an application includes receiving a request for manager permission from the application, determining, using the processor, whether the application is included in an application list including information of applications authorized to receive manager permission, and determining whether to allow the manager permission to the application if the application is included in the application list.

19 Claims, 4 Drawing Sheets

(56) References Cited

U.S. PATENT DOCUMENTS

| | | | |
|---|---|---|---|
| 2004/0230835 A1* | 11/2004 | Goldfeder et al. | 713/201 |
| 2005/0060565 A1* | 3/2005 | Chebolu et al. | 713/200 |
| 2007/0011727 A1* | 1/2007 | Mielenz et al. | 726/6 |
| 2009/0031403 A1* | 1/2009 | Huang | 726/4 |
| 2009/0270080 A1* | 10/2009 | Mathew et al. | 455/414.1 |
| 2010/0014459 A1* | 1/2010 | Mir et al. | 370/328 |
| 2012/0185912 A1* | 7/2012 | Lee et al. | 726/1 |

OTHER PUBLICATIONS

Zone Labs, LLC., "User Guide for Zone Labs security software, version 6.5", 2006, XP002699787, retrieved from "http://download.zonealarm.com/bin/media/pdf/zaclient65_user_manual.pdf".

* cited by examiner

TERMINAL AND METHOD FOR ASSIGNING PERMISSION TO APPLICATION

CROSS-REFERENCE TO RELATED APPLICATION

This application claims priority from and the benefit under 35 U.S.C. §119(a) of Korean Patent Application No. 10-2012-0019064, filed on Feb. 24, 2012, which is hereby incorporated by reference for all purposes as if fully set forth herein.

BACKGROUND

1. Field

Exemplary embodiments of the present invention relate to technology capable of executing an application, and more particularly, to a terminal and a method for assigning permission to an application installed in the terminal.

2. Discussion of the Background

The development and distribution of smart phones have been increasing, and evolved operating systems (OSs) capable of adding and managing a new application, function, and the like have been installed in many smart phones. For example, OSs widely installed in smart phones include Android™ OS of Google, iOS® of Apple®, BadaOS of Samsung®, Windows® Phone OS, and the like. The aforementioned OSs may be provided in a form of an operating system and may also be provided in a platform in which a library for an application, a framework, and the like are packaged. Among such platforms, the Linux-based Android™ platform is widely adopted.

An OS of a smart phone may assign permission to each process and differentiate an access to an input/output (I/O) device, a file, and the like based on the assigned permission. For example, a process assigned with general user permission may access only files and I/O devices that the process is in charge of. On the other hand, a process assigned with root permission may access all the I/O devices and files.

A Linux-based OS, such as Android™, may set and manage access permission with respect to an I/O device, a file, and the like.

The access permission may be classified as general user permission and root permission. An application or a process assigned with the general user permission may access only I/O devices and files of the limited range.

Among smart phone users, some users may desire to change a user interface of a mobile communication terminal, to delete a built-in application included in the release thereof, or to change a setting value for rate enhancement, in order to customize their own terminal. For the above operation, an access to a system file may be required. Also, Root permission may be required to access the system file.

When a super user (SU) utility for changing a corresponding account to root permission is executed, the root permission may be simply obtained. A 'SU' command of Linux that is a basis of Android™ may be located in a system/bin directory or a system/xbin directory in a form of an execution file. Permission may be set to be executable even by a general user. Accordingly, an Android terminal provider may release terminals by removing an SU execution file for executing the SU command for security and system protection.

However, users who attempt rooting may be assigned with the root permission by copying the SU execution file to the system/bin directory or the system/xbin directory using the SU utility and by executing the SU command.

SUMMARY

Exemplary embodiments of the present invention provide a terminal and method for assigning permission to an application.

Additional features of the invention will be set forth in the description which follows, and in part will be apparent from the description, or may be learned by practice of the invention.

Exemplary embodiments of the present invention provide a terminal to assign permission to an application including a storage device to store an application list including information of applications authorized to receive manager permission, and an application processor to receive a request for the manager permission from the application and to determine to allow the manager permission to the application in response to a determination that the application is included in the application list.

Exemplary embodiments of the present invention provide a terminal to assign permission to an application including a modem processor to store an application list including information of applications authorized to receive manager permission, an application processor to receive a request for the manager permission from the application and to determine whether the application is included in the application list, and a shared memory to bridge the modem processor and the application processor.

Exemplary embodiments of the present invention provide a method that uses a processor to assign permission to an application including receiving a request for manager permission from the application, determining, using the processor, whether the application is included in an application list including information of applications authorized to receive manager permission, and determining whether to allow the manager permission to the application if the application is included in the application list.

It is to be understood that both forgoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. Throughout the drawings and the detailed description, unless otherwise described, the same drawing reference numerals are understood to refer to the same elements, features, and structures. The relative size and depiction of these elements may be exaggerated for clarity.

It will be understood that when an element is referred to as being "connected to" another element, it can be directly connected to the other element, or intervening elements may be present.

Hereinafter, exemplary embodiments of the present invention will be described in detail with reference to the accompanying drawings.

Figure 1:
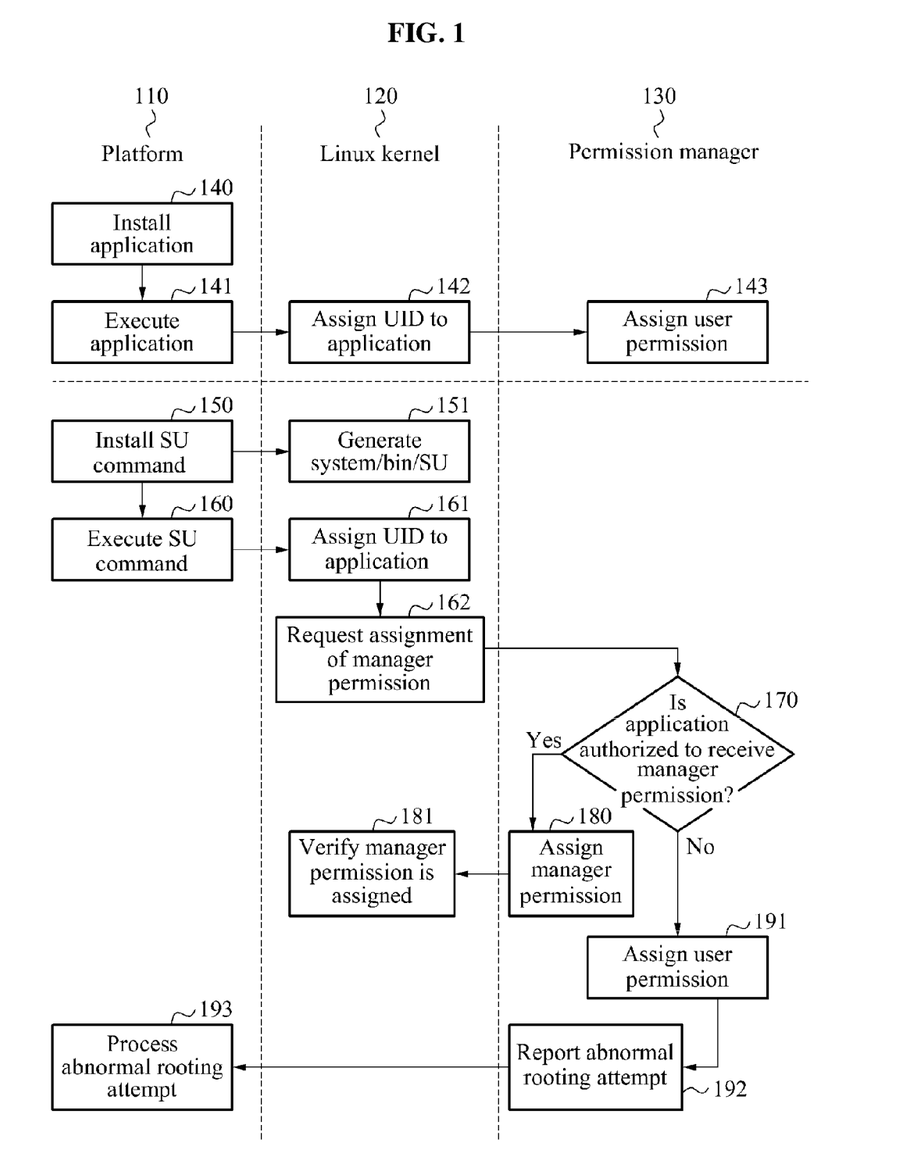
FIG. 1 is a flowchart illustrating a method for assigning permission according to an exemplary embodiment of the present invention.

FIG. 1 is a flowchart illustrating a method for assigning access permission in a smart phone installed with an Android platform according to an exemplary embodiment of the present invention.

Access permission may refer to permission that permits a specific user or a process to access a program or a computer system within a computer network. Further, the access permission may refer to permission that permits a user to access specific data or program and to use the same in a specific form. The access permission may be understood as permission that permits an application or a process to be capable of accessing and using specific data or program within a terminal.

Content of the access permission may denote a manipulation, for example, reading of a data item, such as a file or a record or a predetermined column, writing by appending a new item or by modifying an existing item, deleting an existing item, and the like.

The access permission may be classified into several categories including general user permission and root permission. An application or a process assigned with the general user permission may access only an input/output (I/O) device and allowed files of the limited range. An application or a process assigned with the root permission may access all the I/O devices and files including a system file. The root permission may also be referred to as manager permission (or administrator permission).

In FIG. 1, description may be made based on an Android platform that uses a Linux kernel as an operating system (OS) for a smart phone. However, the present invention may be similarly applied to other smart phones using different Oss, such as iOS®, Windows®Mobile OS, Bada OS, Symbian OS, and the like.

A platform 110 installed in a smart phone may include an OS, a library for an application, a framework, and the like. The Android platform may use a Linux kernel 120 as part of an OS, and may provide a library based on an open source, such as Scalable Graphics Library (SGL), SQLite, and the like. Also, the platform 110 may provide a framework that is produced using JAVA or other programming languages.

According to an aspect, the Linux kernel 120 may provide a driver for controlling a display, a camera, a keypad, a universal serial bus (USB), and the like. The open-source based library may provide a web browsing service, a database service, and the like. Further, the framework produced using JAVA or other programming languages may provide an audio processing service, a position information processing service, and the like.

The Android application may generate processes. Each of the processes may perform a work by calling the framework. The framework may provide a service to an application by calling the open-source based library.

The Linux kernel 120 manages a security, a memory, a process, a network stack, a hardware driver, and the like. In addition, the Linux kernel 120 may assign UID to an application. The UID refers to a user identifier (ID) assigned to each application.

A permission manager 130 may manage each application and permission of a process associated with each application. The permission manager 130 may assign permission to each process based on an application that has created a corresponding process. For example, the permission manager 130 may assign user permission with respect to a process that is created by an application capable of being assigned with the user permission, and may assign manager permission with respect to a process that is created by an application capable of being assigned with the manager permission.

The process assigned with the user permission may perform only works that are determined by the user permission, such as access to an I/O device, a file, and the like. On the other hand, the process assigned with the manager permission may perform all the works, such as access to all the I/O devices, all the files, and the like. Accordingly, if a user desires to change a user interface and the like, or if an application is to hack into a smart phone, the user or the application acquires the manager permission beforehand.

For example, an application installed in operation 140 is assumed to be a general application that does not attempt rooting. The general application may be an application that is primarily verified by a platform provider about whether the corresponding application attempts hacking or rooting. An application that is downloaded from a verified market and installed, for example, Kakao Talk may be an example of the general application.

In operation 141, the installed application may be executed. The executed application may generate a process in order to perform a predetermined work. The generated process may be assigned with permission in order to perform a detailed work.

For the above operation, in operation 142, the Linux kernel 120 may assign UID to the corresponding application. Further, in operation 143, the permission manager 130 may assign user permission to the generated process. If the process is assigned with the user permission, the corresponding process may perform the predetermined work using an accessible file or an I/O device.

In operation 150, a malicious application may install a SU command in a 'system/bin' directory in order to obtain manager permission. The malicious application may be an application including an exploit code that attempts abnormal rooting. The malicious application may temporarily obtain the manager permission using a vulnerable point of the terminal, and may install SU utility in the system/bin directory using the obtained temporary manager permission.

In operation 151, system/bin/SU may be generated.

In operation 160, the SU command may be executed. If the SU utility is installed, even an application having the user permission may execute the SU command installed in the 'system/bin' directory. The SU command may refer to a command for assigning the manager permission to an entity that has executed the command.

Only applications having the manager permission may perform a write or a read in the system/bin directory. However, an application having the user permission may also perform execution with respect to the system/bin directory. Accordingly, the malicious application may execute the SU command installed in the system/bin directory using the user permission and may be assigned with the manager permission. The SU command may be executed whenever the terminal is booted.

If an application is executed, the Linux kernel 120 may assign UID to the executed application in operation 161. Further, the Linux kernel 120 may request the process generated by the application to assign the manager permission in operation 162.

In operation 170, the permission manager 130 may determine whether the executed application is an application capable of being assigned with the manager permission. The permission manager 130 may store and manage a list of applications that are capable of being assigned with the manager permission. The permission manager 130 may determine whether the executed application is included in the list of applications. If the executed application is included in the list of applications, the permission manager 130 may verify that the executed application is an application authorized to receive the manager permission. If the executed application is not included in the list of applications, the permission manager 130 may verify that the executed application is an application not authorized to receive the manager permission.

If the executed application is an application authorized to receive the manager permission, the permission manager 130 may assign the manager permission to the process that is generated by the executed application in operation 180. In operation 181, the Linux kernel 120 may verify that the manager permission is assigned to the corresponding process of the executed application.

If the executed application is an application not authorized to receive the manager permission, the permission manager 130 may assign the user permission to the corresponding process instead of the manager permission in operation 191.

Even though the SU command is installed in the system/bin directory through the vulnerable point, only an application included in the list of applications may be assigned with the manager permission. Accordingly, the application added through malicious hacking may not be assigned with the manager permission, and the terminal may be protected from the malicious hacking.

In operation 192, the permission manager 130 may report to the user that the corresponding application has attempted abnormal rooting. For example, an alert message including information of the malicious application may be displayed on a display apparatus. In response to the alert message, the user may input a command for deleting the malicious application. In operation 193, the platform 110 may delete the malicious application in response to the user command.

According to the aspects, the permission manager 130 may store and manage a list of applications capable of obtaining the manager permission. Accordingly, even though the SU command is installed by a malicious user, process, or application, assignment of the manager permission to the executed application may be restricted. Accordingly, it may be possible to reduce the damage by the malicious rooting.

Figure 2:
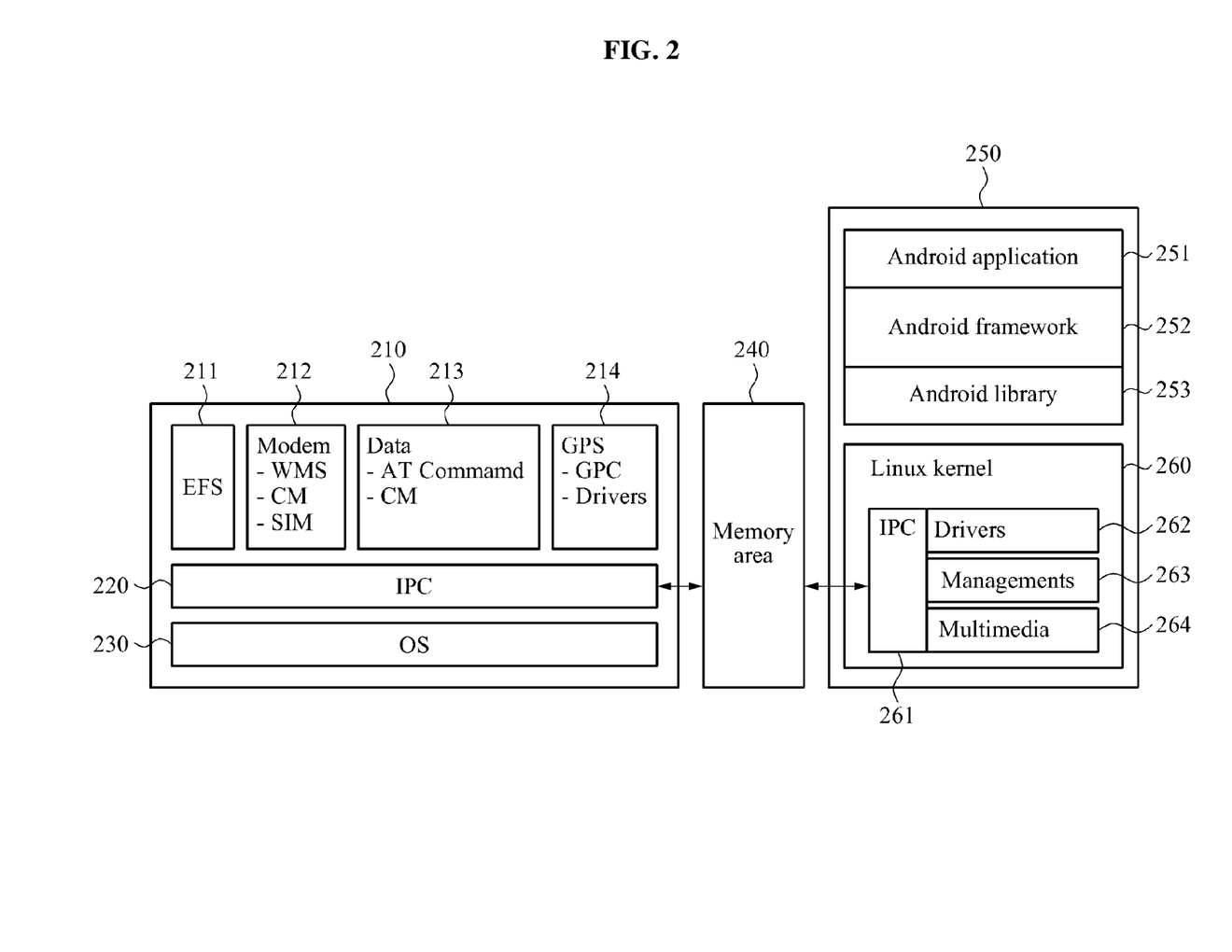
FIG. 2 is a block diagram illustrating a software structure operating in different processors according to an exemplary embodiment of the present invention.

FIG. 2 is a block diagram illustrating a software structure operating in different processors according to an exemplary embodiment of the present invention.

Referring to FIG. 2, a terminal may include a modem processor 210 to process communication with a wireless network, a global positioning system (GPS), and the like, and an application processor 250 to process execution of an application, OS driving, and the like.

The modem processor 210 may drive encrypting file system (EFS) software 211, modem software 212, data processing software 213, GPS software 214, and the like. Also, the modem processor 210 may drive inter-processor communication (IPC) software 220 that is in charge of communications with the application processor 250. Further, the modem processor 210 may include an OS 230 for driving the encrypting file system (EFS) software 211, the modem software 212, the data processing software 213, the GPS software 214, and the like.

The application processor 250 may drive an Android platform. The Android platform may include a Linux kernel 260, an open-source based Android library 253, an Android framework 252, and an Android application 251. The Linux kernel 260 may include an IPC module 261 that is in charge of communications with the modem processor 210, drivers 262 for driving hardware, a memory manager 263, a multimedia processing unit 264, and the like.

The Android application 251 may generate processes. Each of the processes may perform a work by calling the Android framework 252 that is produced using JAVA, depending on necessity. The Android framework 252 may provide a service to the Android Application 251 by calling the Android library 253.

According to an aspect, software driven by the modem processor 210, e.g., EFS software 211, modem software 212, data processing software 213, and GPS software 214, and software driven in the application processor 250, e.g., the Android application 251, the Android framework 252, and the Android library 253, may exchange data using an inter processor communication function provided by the IPC module 261.

The modem processor 210 and/or the application processor 250 may perform the IPC communication to check the application list stored in the modem processor 210. The IPC module 261 may exchange data using a pipe scheme or a shared memory scheme. The pipe scheme refers to a communication scheme in which a plurality of processes may exchange data using a temporary file. That is, the pipe scheme is an inter-processor data sharing communication scheme in which one of processes stores data in the temporary file while another process loads the stored data. The shared memory scheme refers to an inter-processor data sharing communication scheme in which one of processors stores data in a memory area 240 accessible by both the application processor 250 and the modem processor 210 while another processor loads the stored data. Accordingly, it may be possible to share data among multiple processors using one of the schemes. The memory area 240 may be a shared memory for the application processor 250 and the modem processor 210. Further, the application processor 250 may include a process management module for managing processes of the Linux kernel. The process management module may manage a process identifier (PID) of each process and maintain information of a process having a specific PID, a UID that executes the process, application information assigned with the UID, and the like. When the PID information is updated, permission of the corresponding process may be changed from user permission to manager permission. If a process obtains the root permission, the terminal may verify the process whether the process corresponds to a process of an application included in the list of applications authorized to receive manager permission. If the process does not correspond to a process of an application included in the list of applications authorized to receive manager permission, the terminal may terminate the process and transmit the information of the process and corresponding application to a security management server.

Further, as shown in FIG. 2, data may be shared using IPC of the shared memory scheme.

Software of the modem processor 210 may be separated from software of the application processor 250. Therefore, even firmware distributed by one producer may be individually distributed with respect to each of the modem processor 210 and the application processor 250.

In general, even an application that attempts malicious rooting may attempt rooting using a vulnerable point of the application processor 250 and may not attempt rooting through the modem processor 210.

A list of applications authorized to receive the manager permission may be stored in EFS 211 of the modem processor 210. A permission manager may be driven by the application processor 250 together with the Linux kernel 260. The permission manager may load the list of applications stored in the EFS 211 using the memory area 240. The list of applications may be updated by a firmware upgrade or update provided by an authorized service provider, a manufacturer of the terminal, or the like.

If the list of applications is stored in the modem processor 210, the list of applications stored in the modem processor 210 may be protected from hacking even though software driven in the application processor 250 is hacked into. Accordingly, the list of applications authorized to receive the manager permission may also be protected. Even though software driven in the application processor 250 is hacked, the terminal may be protected from an unauthorized rooting.

Figure 3:
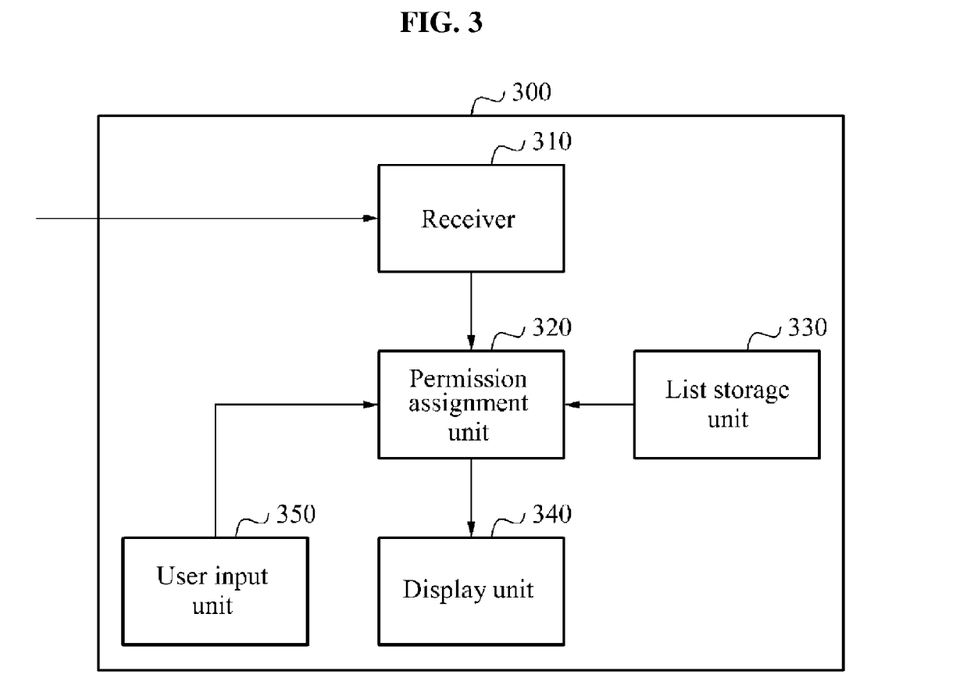
FIG. 3 is a block diagram illustrating a structure of a terminal according to an exemplary embodiment of the present invention.

FIG. 3 is a block diagram illustrating a structure of a terminal according to an exemplary embodiment of the present invention.

Referring to FIG. 3, a terminal 300 may include a receiver 310, a permission assignment unit 320, a list storage unit 330, a display unit 340, and a user input unit 350. The terminal 300 may include a communication unit (not shown) to transmit information about an application requested for manager permission and not included in a list of application. The communication unit may include one or more antennas, and modulator/demodulator, etc.

The receiver 310 may receive a request for manager permission from a target application. The target application may be a program that is installed in an Android platform.

In response to the request for the manager permission, the permission assignment unit 320 may verify whether the target application is an application authorized to receive the manager permission.

The list storage unit 330 may store a list of applications authorized to receive the manager permission. The permission assignment unit 320 may determine whether the target application is included in the list of applications stored in the storage unit 330. If the target application is included in the list of applications, the permission assignment unit 320 may verify that the target application is authorized to receive the manager permission. If the target application is not included in the list of applications, the permission assignment unit 320 may verify that the target application is not authorized to receive the manager permission.

The terminal 300 may include the modem processor 210 and the application processor 250 illustrated in FIG. 2. The receiver 310 and the permission assignment unit 320 may be driven in the application processor 250, and the list storage unit 330 may be driven in the modem processor 210. The permission assignment unit 320 may load the list of applications that are authorized to receive the manager permission stored in the modem processor 210 using IPC.

As described above, even though software driven in the application processor 250 is hacked, the list storage unit 330 driven in the modem processor 210 may be protected. Accordingly, the terminal 300 may be protected from a malicious rooting.

According to an aspect, if a target application corresponds to an application authorized to receive the manager permission, the permission assignment unit 320 may assign the manager permission to a process generated by the target application. If the process generated by the target application is assigned with the manager permission, the target application may access all the I/O devices using the generated process, and may create, delete, or change all the files stored in the terminal 300.

If the target application corresponds to an application not authorized to receive the manager permission, the permission assignment unit 320 may assign user permission to the target application. The target application may access only a portion of I/O devices based on the user permission using the generated process, and may create, delete, or change a portion of unrestricted files stored in the terminal 300.

If the target application corresponds to an application not authorized to receive the manager permission, the display unit 340 may display information of the target application, such as a request for manager permission transmitted from the target application, to a user.

The user input unit 350 may receive, from the user, a processing command with respect to the target application. For example, the processing command may relate to whether to assign the manager permission to the target application. If the user input unit 350 receives a command to assign the manager permission to the target application, the permission assignment unit 320 may assign the manager permission to the target application even though the target application is not included in the list of applications stored in the list storage unit 330. Further, the processing command may be a command to delete the target application or to transmit information about the target program to a security management server. If the processing command is a command to delete the target application, the permission assignment unit 320 may delete the target application that attempts rooting. The information about the target program may be automatically transmitted to the security management server without the processing command.

Figure 4:
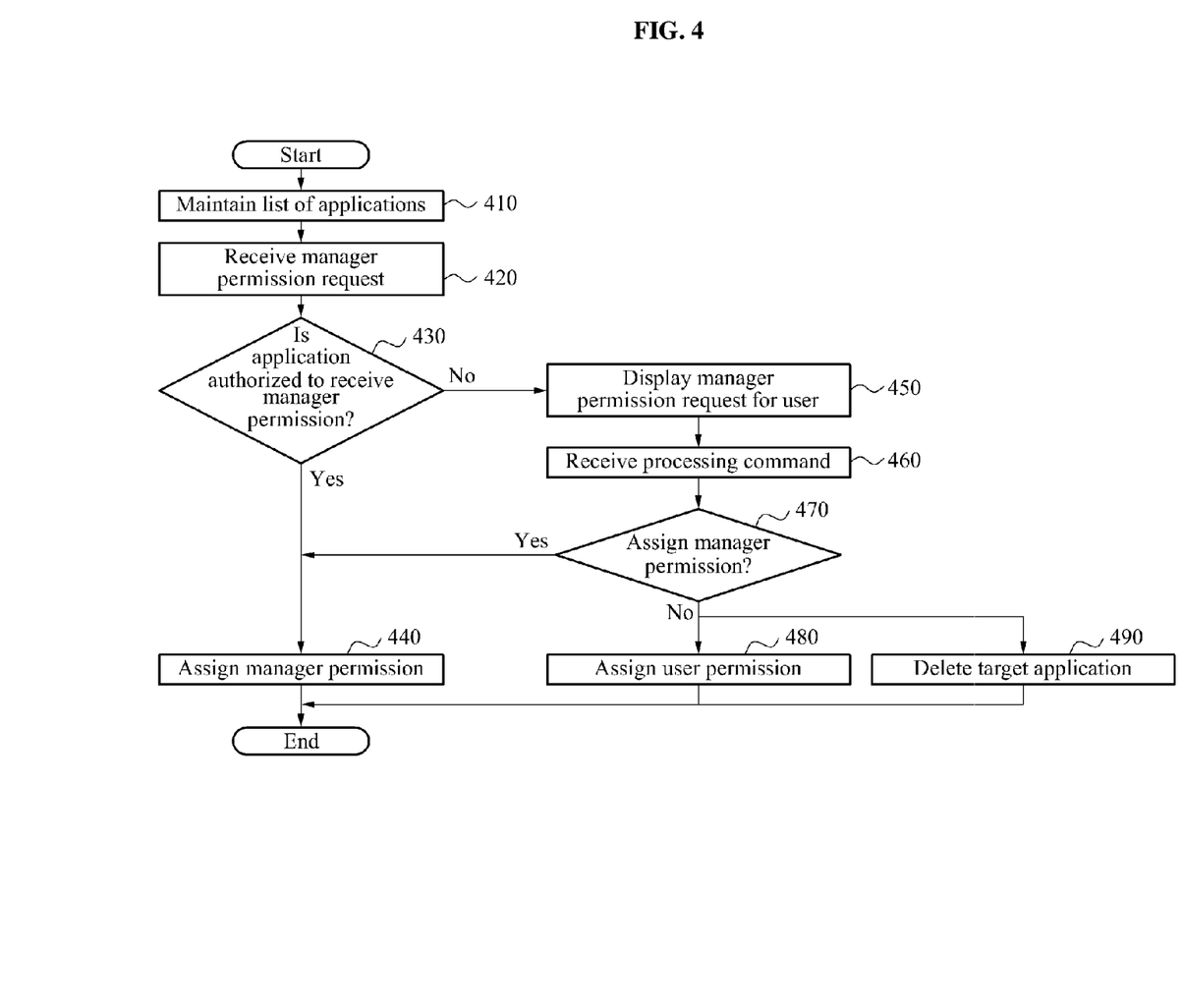
FIG. 4 is a diagram illustrating a method for assigning permission according to an exemplary embodiment of the present invention.

FIG. 4 is a diagram illustrating a method for assigning permission according to an exemplary embodiment of the present invention.

In operation 410, a terminal may store and maintain a list of applications authorized to receive manager permission.

In operation 420, the terminal may receive a request for manager permission from a target application.

In operation 430, the terminal may verify whether the target application is an application authorized to receive the manager permission. For example, the terminal may determine whether the target application is included in the list of applications authorized to receive the manager permission, and may verify that the target application is an authorized application to receive the manager permission depending on the determination result.

For example, if the target application is included in the list of applications, the terminal may verify that the target application is authorized to receive the manager permission. If the target application is not included in the list of applications, the terminal may verify that the target application is not authorized to receive the manager permission.

If the target application is verified as the application authorized to receive the manager permission, the terminal may assign the manager permission to a process generated by the target application in operation 440. If the process is assigned with the manager permission, the target application may access all the I/O devices using the generated process, and may create, delete, or change all the files stored in the terminal.

If the target application is verified as the application that is unauthorized to receive the manager permission, the terminal may display information about the target application including the manager permission request from the target application to the user in operation 450.

The user may receive a report about the manager permission request from the target application and may input a processing command with respect to the target application in operation 460. The processing command with respect to the target application may relate to whether to assign the manager permission to the target application.

In operation 470, the terminal may analyze the processing command input from the user. If the processing command indicates the manager permission to be assigned to the target application, the terminal may assign the manager permission to the target application in operation 440.

If the processing command indicates the manager permission not to be assigned to the target application, the terminal may assign the user permission to the target application in operation 480. With the user permission, the target application may access only a portion of I/O devices that are not restricted to the user permission and may create, delete, or change the portion of files.

If the processing command indicates the manager permission not to be assigned to the target application, the terminal may delete the target application in operation 490.

Exemplary embodiments according to the present invention may be recorded in non-transitory computer-readable media including program instructions to implement various operations embodied by a computer having one or more processors and memories, such as a random access memory (RAM) and a read-only memory (ROM). The media may also include, alone or in combination with the program instructions, data files, data structures, and the like. The media and program instructions may be those specially designed and constructed for the purposes of the present invention, or they may be of the kind well-known and available to those having skill in the computer software arts.

According to exemplary embodiments of the present invention, it may be possible to reduce malicious rooting with respect to a terminal using a list of applications authorized to obtain root permission.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A terminal to assign permission to an application, comprising:
    a storage device to store an application list comprising information of applications authorized to receive manager permission, the manager permission configured to authorize a privilege to all input/output (I/O) devices of the terminal and restricted files including a system file of the terminal; and
    an application processor to receive a request for the manager permission from an application, and to determine to allow the manager permission to the application in response to a determination that the application is included in the application list,
    wherein user permission is configured to authorize a limited privilege such that an access to an input/output device or a restricted file of the terminal is denied to an application having the user permission,
    wherein the storage device comprises an embedded file system in a modem processor to store the application list, the modem processor being connected to the application processor via an inter-processor communication interface, and
    wherein the application list is configured to be inaccessible by an application having the user permission.

2. The terminal of claim 1, wherein the application list is stored in a file system of an operating system in the application processor, and
    the privilege comprises a write permission to the system file.

3. The terminal of claim 1, further comprising: a display unit to display information of the request for the manager permission associated with the application if the application is not included in the application list.

4. The terminal of claim 3, further comprising: an input unit to receive a command to delete the application from a user in response to the displayed information.

5. The terminal of claim 1, further comprising: a communication unit to transmit information of the request for the manager permission associated with the application to a server or another terminal.

6. The terminal of claim 1, wherein the application processor receives the application list from the storage device via an inter-processor communication.

7. The terminal of claim 1, wherein the application processor authorizes the manager permission to the application if the application is included in the application list, and authorizes the user permission to the application if the application is not included in the application list.

8. The terminal of claim 1, wherein the application list is updatable by a firmware upgrade.

9. The terminal of claim 1, wherein, if the application is not included in the application list, the application processor denies the allowance of the manager permission to the application in response to a superuser (SU) command executed by the application.

10. The terminal of claim 1, wherein the modem processor determines whether the application is included in the application list.

11. A terminal to assign permission to an application, comprising:
    a modem processor to store an application list comprising information of applications authorized to receive manager permission, the manager permission configured to authorize a privilege to all input/output (I/O) devices of the terminal and restricted files including a system file of the terminal;
    a storage device;
    an application processor to receive a request for the manager permission from an application, and to determine whether the application is included in the application list; and
    an inter-processor communication interface to bridge the modem processor and the application processor,
    wherein user permission is configured to authorize a limited privilege such that an access to an input/output device or a restricted file of the terminal is denied to an application having the user permission, wherein the storage device comprises an embedded file system in the modem processor to store the application list, the modem processor being connected to the application processor via an inter-processor communication interface, and wherein the application list is configured to be inaccessible by an application having the user permission.

12. A method that uses a processor to assign permission to an application, comprising:

receiving a request for manager permission from an application installed in a terminal;

determining, using the processor, whether the application is included in an application list comprising information of applications authorized to receive manager permission, the manager permission configured to authorize a privilege to all input/output (I/O) devices of the terminal and restricted files including a system file of the terminal; and determining whether to allow the manager permission to the application if the application is included in the application list, wherein user permission is configured to authorize a limited privilege such that an access to an input/output device or a restricted file of the terminal is denied to an application having the user permission, wherein a storage device comprises an embedded file system in a modem processor to store the application list, the modem processor being connected to the processor via an inter-processor communication interface, and wherein the application list is configured to be inaccessible by an application having the user permission.

13. The method of claim 12, wherein the application list is stored in an embedded file system in the modem processor, and wherein information of the application list is retrieved via an inter-processor communication between the modem processor and the processor, the processor being an application processor.

14. The method of claim 12, wherein the application list is stored in a file system of an operating system in an application processor.

15. The method of claim 12, further comprising: displaying information of the request for the manager permission associated with the application.

16. The method of claim 15, further comprising: receiving a command to delete the application from a user in response to the displayed information.

17. The method of claim 12, further comprising: transmitting information of the request for the manager permission associated with the application to a server or another terminal.

18. The method of claim 12, wherein the application list is updatable by a firmware upgrade.

19. The method of claim 12, further comprising:

if the application is not included in the application list, denying the allowance of the manager permission to the application in response to a superuser (SU) command executed by the application.

* * * * *